United States Patent

Pieper

Patent Number: 5,277,071
Date of Patent: Jan. 11, 1994

[54] HYDROMETRIC VANE

[75] Inventor: Herbert Pieper, Hemmingen, Fed. Rep. of Germany

[73] Assignee: H.Meinecke AG, Laatzen, Fed. Rep. of Germany

[21] Appl. No.: 841,360

[22] Filed: Feb. 25, 1992

[30] Foreign Application Priority Data

Feb. 25, 1991 [DE] Fed. Rep. of Germany ....... 4105840

[51] Int. Cl.⁵ .............................................. G01F 1/12
[52] U.S. Cl. ............................ 73/861.83; 73/861.81; 73/861.91
[58] Field of Search ........... 73/861.83, 861.81, 861.91, 73/861.92

[56] References Cited

U.S. PATENT DOCUMENTS

| | | | |
|---|---|---|---|
| 3,811,323 | 5/1974 | Swenson | 73/861.83 |
| 4,100,803 | 7/1978 | Gass | 73/861.81 |
| 4,186,603 | 2/1980 | Dubae | 73/861.81 |

FOREIGN PATENT DOCUMENTS

| | | |
|---|---|---|
| 0076189 | 9/1982 | European Pat. Off. |
| 1279355 | 7/1958 | Fed. Rep. of Germany |
| 35029251 | 8/1985 | Fed. Rep. of Germany |

Primary Examiner—Herbert Goldstein
Assistant Examiner—Harshad Patel
Attorney, Agent, or Firm—Michael J. Striker

[57] ABSTRACT

A hydrometric vane has a housing, an upstream casing and a downstream casing provided in the housing, an impeller rotatably supported in the housing and axially movable between the casings. The impeller has a hub which forms an annular chamber and extends into the downstream casing to form a gap therebetween so that when a fluid flows through the gap an underpressure loading the hub is caused and compensates a hydrodynamic pressure acting on the impeller. The hub has a central part and a cylindrical casing between which the annular chamber is formed. The downstream casing has at least one opening communicating with the annular chamber so that the liquid which leaves the annular chamber can flow through the at least one opening. A closure member is arranged on the central part and movable to a closing position in which it interrupts a communication between the annular chamber and the downstream casing. A ring is located in the region of the gap and extending into the annular chamber, and a counter ring is provided at an outlet end of the ring gap.

3 Claims, 1 Drawing Sheet

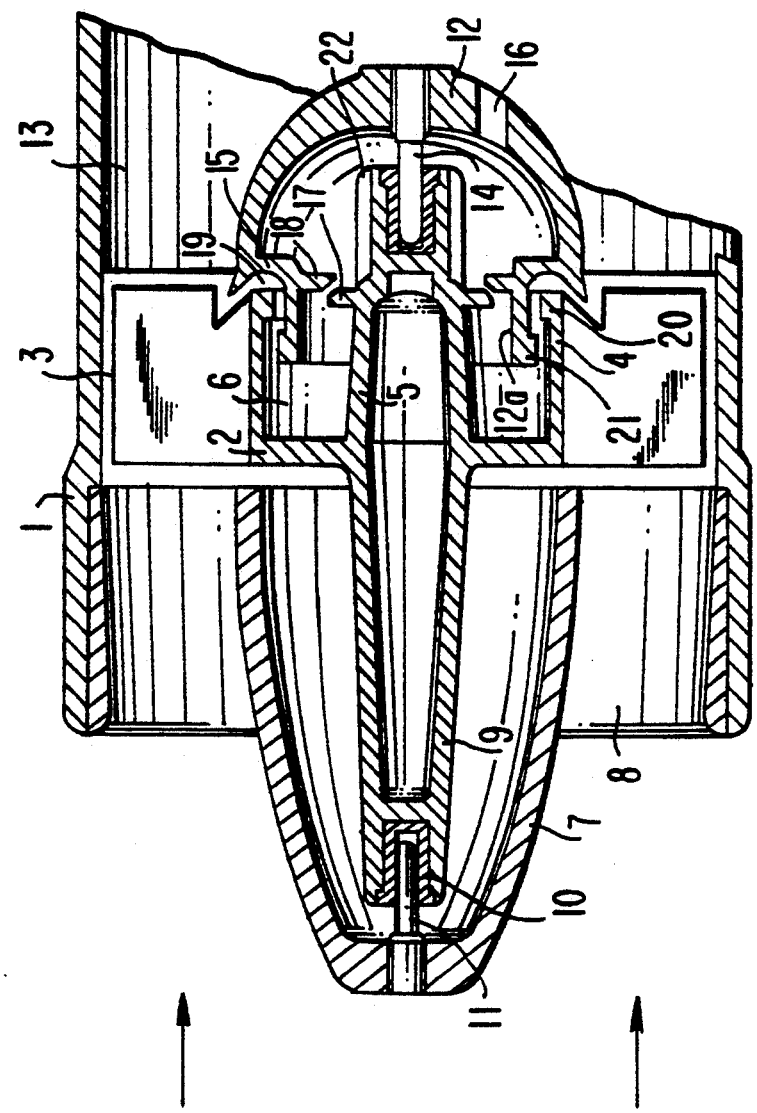
FIG. I

HYDROMETRIC VANE

BACKGROUND OF THE INVENTION

The present invention relates to a hydrometric vane or so-called sail wheel of Waltmann.

European patent document EP-PS 0,076,189 B1 shows a flow measuring device or flow meter of the above mentioned type. The device disclosed in this reference has a guiding element for passing a fluid medium to be measured under a predetermined pressure, and a turbine located in the guiding element and having vanes on a periphery of its cylindrical hub. The turbine is supported rotatably and also axially movably between two stationary casings located upstream and downstream respectively. Also a means is provided to produce a zone with an underpressure of approximately constant value independently from the axial position of the hub at one side of a transverse surface of the upstream end of the hub. On the other hand, the downstream casing embraces a hollow cylindrical part in which the downstream end of the above mentioned hub extends with a play to provide an overpressure zone at the side of the transverse surface of the downstream end of the hub. Thereby a hydrodynamic thrust, resulting from the flow of the fluid medium, is always compensated due to the difference between the above mentioned overpressure and the above mentioned underpressure, so that the above mentioned downstream end of the hub has a diameter increase relative to the remaining part of the above mentioned hub. The combination of relative profile of the downward widened end of the hub and the downward casing determines the overpressure in such a way that it reduces when the hub moves in the axial direction relative to the upstream casing.

Depending on the flow speed of the liquid the forces change in the flow direction and require a corresponding change in the oppositely directed dynamic pressure force. This is achieved by the axial movement of the impeller. In the known arrangement relatively great axial movements of the impeller are required in order to achieve the suspended condition of the blades. Moreover, the regulating conditions are relatively unstable.

SUMMARY OF THE INVENTION

Accordingly, it is an object of the present invention to provide a hydrometric vane which avoids the disadvantages of the prior art.

More particularly, it is an object of the present invention to provide such a hydrometric vane in which the non-uniform small axial movements of the impeller are dispensed with and moreover stable regulating conditions are obtained.

In keeping with these objects and with others which will become apparent hereinafter, one feature of the present invention resides, briefly stated, in a hydrometric vane in which the downwardly located casing has at least one opening for discharging the liquid which leaves an annular chamber of the hub, and on a central part a closure member is arranged which in a closing position interrupting the communication between the annular chamber and the downward casing approaches a seat connected with the casing, a ring is provided in the region of a gap on the cylindrical surface and extends into the annular chamber, and a counter ring is arranged on the outer periphery of a hollow cylindrical part of the downward casing which radially limits the outlet end of the annular gap.

Due to the opening or openings in the downstream casing for discharging the liquid leaving the annular chamber of the hub, and due to the arrangement of the closure member in the central part with the associated seat, and the arrangement of both rings in the annular gap, a regulated throughflow is insured, and the regulated throughflow results indirectly in a regulation of the pressure, the hub axial force and the position of the impeller. The impeller in this situation is a regulator itself. Moreover, this special arrangement results in a significant reduction of the axial movements of the impeller as well as stable regulating conditions.

Due to the arrangement of at least two throttling points, and expanded adjusting region for the throughflow regulation and an increase of the stabilization in connection with reduced axial movements of the impeller for lengthening of the axial suspended condition are achieved.

In accordance with another advantageous feature of the present invention, the rings are offset relative to one another in an axial direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view which schematically shows a cross-section of a hydrometric vane in accordance with the present invention.

DESCRIPTION OF THE PREFERRED EMBODIMENTS

A hydrometric vane in accordance with the present invention has a substantially cylindrical housing which is identified with reference numeral 1. An impeller 2 which has a vane rim 3 and a hub is rotatably supported in the housing. The hub has a cylindrical jacket 4 and a central part 5 oriented to the right in the drawings. The parts 4 and 5 of the hub together limit an annular chamber 6.

The upstream casing is identified with reference numeral 7 and is connected with a housing 1 by a pipe 8 extending in a radial direction. A substantially frusto-conical part 9 with a bearing 10 is connected with the central part 5. A pin 11 is connectable with the casing 7 and engages into the bearing 10 with a small radial play. A downstream casing is identified with reference numeral 12. It is formed substantially as a bell and connected with the housing 1 by a pipe 13. The central part 5 of the hub has a screw or a worm 22 on its downstream end. The worm 22 acts through a not shown worm shaft on a rotary shaft for a meter of the hydrometric vane.

The worm 22 is supported on its one side on a pin 14 connected with the casing 12. The impeller 2 is axially displaceable within certain limits due to the bearing 10 and the bearing with the pin 14.

The casing 12 has substantially the form of a bell which in its edge region is provided with a depression 15. The cylindrical jacket 4 of the hub engages in the depression 15 so as to form a gap 19 therebetween.

In accordance with an important feature of the invention, the casing 12 has an opening 16. The liquid which leaves the annular chamber 6 of the hub can flow outwardly through the opening 16. It is to be understood that both the single opening 16 and also a plurality of such openings can be provided within the spirit of the present invention.

A closure member 17 formed as a disc is provided on the central part 5. In the position in which it interrupts the communication between the annular chamber 6 and the downward casing 12, the closure member 17 approaches a seat 18 connected with the casing 12.

A ring 20 is provided in the region of the gap 19 and extends into the annular chamber 6. Moreover, a counter ring 21 is arranged on the outer periphery of a hollow cylindrical part 12a of the downstream casing 12. The part 12a radially limits the outlet end of the annular gap 19.

The hydrometric vane in accordance with the present invention operates in the following manner. The liquid to be measured is supplied to the meter in the direction identified with the arrows. The liquid exiting the vane rim of the impeller 2 causes its rotary movement, and during flowing around the impeller 2 hydraulic forces in the axial direction are produced. These axial forces are produced due to the pressure difference between the front side and the rear side of the vane rim of the impeller 2. Under the action of the pulse produced therefrom the impeller 2 is moved to the right in the drawings. The liquid passes through the annular gap 19 and forms a counterpressure which moves the impeller 2 against the flow direction or to the left in the drawings until the equilibrium is reached between both pressure forces. Then the liquid flows through the gap between the closure member 17 and the seat 18 and then flows outwardly through the opening 16. Due to the regulation of these both gaps only relatively small axial movements of the impeller 2 take place. The regulated throughflow acts to provide a regulation of the pressure conditions, the axial force acting on the impeller 2, and its position as well.

It will be understood that each of the elements described above, or two or more together, may also find a useful application in other types of constructions differing from the types described above.

While the invention has been illustrated and described as embodied in a hydrometric vane, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hydrometric vane, comprising a housing; an upstream casing and a downstream casing provided with at least one opening and an edge region with a depression; an impeller rotatably supported in said housing and axially movable between said casings, said impeller having a hub which forms an annular chamber and has an edge in the region of said downstream casing, said hub having a cylindrical jacket and a central part which limit said annular chamber; communication interrupting means including a valve seat provided in said downstream casing and a closure member provided on said central part of said hub so that when in a closing position said closure member abuts against said valve seat a communication between said annular chamber and a downstream chamber in said housing is interrupted, said closure member being disc shaped and fixedly connected with said central part, said valve seat being oriented transversely to a longitudinal central axis of said central part, said cylindrical jacket being provided with an inwardly projecting flange which extends into said depression of said downstream casing to form a ring gap having an inlet end and an outlet end, said downstream casing having an outer periphery provided with a hollow cylindrical part which carries an outwardly projecting counter flange cooperating with said inwardly projecting flange and limiting said outlet end of said ring gap.

2. A hydrometric vane as defined in claim 1, wherein said inwardly projecting flange is provided on said cylindrical jacket, said downstream casing being provided with a hollow cylindrical part which limits radially said annular gap and supports said outwardly projecting counter flange.

3. A hydrometric vane as defined in claim 1, wherein said inwardly projecting flange and said outwardly projecting counter flange are offset relative to one another in an axial direction.

* * * * *